(12) United States Patent
Lysen

(10) Patent No.: US 10,018,488 B2
(45) Date of Patent: Jul. 10, 2018

(54) SENSOR ARRANGEMENT AND METHOD FOR CREATING AN OUTPUT SIGNAL

(71) Applicant: Pruftechnik Dieter Busch AG, Ismaning (DE)

(72) Inventor: Heinrich Lysen, Garching (DE)

(73) Assignee: PRÜFTECHNIK DIETER BUSCH AG, Oskar-Messter-Strasse, Ismaning (DE)

( * ) Notice: Subject to any disclaimer, the term of this patent is extended or adjusted under 35 U.S.C. 154(b) by 419 days.

(21) Appl. No.: 14/047,567

(22) Filed: Oct. 7, 2013

(65) Prior Publication Data

US 2014/0096627 A1 Apr. 10, 2014

(30) Foreign Application Priority Data

Oct. 9, 2012 (DE) .................. 10 2012 109 583

(51) Int. Cl.
 G01D 21/00 (2006.01)
(52) U.S. Cl.
 CPC .................. G01D 21/00 (2013.01)
(58) Field of Classification Search
 CPC .............................. G01D 21/00; H03M 1/00
 USPC ............ 307/40; 333/181; 363/21.04, 39; 367/81–85; 340/12.32–12.39, 538–538.17
 See application file for complete search history.

(56) References Cited

U.S. PATENT DOCUMENTS

| | | | |
|---|---|---|---|
| 4,885,795 A | 12/1989 | Bunting et al. | |
| 6,007,372 A * | 12/1999 | Wood | G01S 19/13 439/502 |
| 6,502,020 B2 * | 12/2002 | Lang | G07C 5/008 340/970 |
| 8,242,928 B2 * | 8/2012 | Prammer | E21B 17/003 340/853.7 |
| 2004/0119587 A1 * | 6/2004 | Davenport | B61L 5/189 340/538 |
| 2006/0205443 A1 * | 9/2006 | Simoens | H04L 1/0003 455/574 |
| 2006/0236910 A1 | 10/2006 | Boucher et al. | |

(Continued)

FOREIGN PATENT DOCUMENTS

| | | |
|---|---|---|
| DE | 4202568 A1 | 7/1992 |
| DE | 19643413 A1 | 5/1998 |

(Continued)

OTHER PUBLICATIONS

Non-Patent Literature Cable-vision, http://web.archive.org/web/20090831221003/http://www.cable-vision.com.tw/POCtext2.html; archived Aug. 31, 2009.*
Non-Patent Literature LDO, http://web.archive.org/web/20110622050355/http://www.circuitstoday.com/ldo-regulator; archived Jun. 22, 2011.*

(Continued)

*Primary Examiner* — Manish S Shah
*Assistant Examiner* — Irving A Campbell
(74) *Attorney, Agent, or Firm* — Barlow, Josephs & Holmes, Ltd.

(57) ABSTRACT

A sensor arrangement (10) includes a sensor (11) for a mechanical quantity or a thermal quantity, a processing circuit (12), which is connected at the input end to the sensor (11) and provides an output signal (SRF), which is processed for wireless transmission, and a cable (13), which is coupled to the processing circuit (12), to which the output signal (SRF) or a signal derived from the output signal (SRF) is supplied and which delivers a power supply to the processing circuit.

12 Claims, 3 Drawing Sheets

(56) References Cited

U.S. PATENT DOCUMENTS

| | | | |
|---|---|---|---|
| 2008/0117037 A1* | 5/2008 | Kenny | B60C 23/0408 340/447 |
| 2011/0023265 A1 | 2/2011 | Singbartl | |
| 2011/0080158 A1* | 4/2011 | Lawrence | H01R 13/665 324/76.12 |
| 2011/0176387 A1* | 7/2011 | Froelich | E21B 47/16 367/82 |
| 2011/0221271 A1* | 9/2011 | Bodnar | G06F 1/325 307/31 |
| 2011/0237125 A1* | 9/2011 | Montena | H01R 13/641 439/578 |

FOREIGN PATENT DOCUMENTS

| | | | |
|---|---|---|---|
| DE | 29916849 U1 | 12/1999 | |
| DE | 102004017760 A1 | 1/2005 | |
| DE | 102005044004 B3 | 5/2007 | |
| DE | 102005059012 A1 | 6/2007 | |
| DE | 60036302 T2 | 6/2008 | |
| EP | 1134909 A1 | 9/2001 | |
| EP | 2068127 A1 | 6/2009 | |
| WO | 2009095110 A2 | 8/2009 | |

OTHER PUBLICATIONS

AN4E, IEPE Accelerometers, Metra Mess- und Frequenztechnik in Radebeul e.K., May 2008, www.MFF.de.

Analog Devices, Preliminary Technical Data, "Precision Analog Microcontroller CortexTM-M3 with ISM band Transceiver—ADuCRF101", 2012, www.analog.com, retrieved from Internet on Jul. 27, 2012.

Data Translation, Inc., Datasheet for DT9841/DT9842 Simultaneous Real-Time DSP Data Acquisition, www.datatranslation.com, 2011.

Texas Instruments, "Low-Power SoC (System-on-Chip) with MCU, Memory, 2.4 GHz RF Transceiver, and USB Controller—CC2510Fx/CC2511Fx", www.ti.com; Jul. 20, 2010.

NXP Laboratories UK Ltd., "Product Brief—JN5148 Module JenNet, ZigBee Pro and IEE802.15.4 Module", www.nxp.com/jennic; 2010.

Texas Instruments Inc., Datasheet—MSP430 Ultra-Low-Power Microcontrollers, www.ti.com/msp430; 2012; retrieved from Internet on Sep. 11, 2012.

STMicroelectronics, Datasheet—"STM32W108HB, STM32W108CC, STM32W108CB, STM32W108CZ High-performance, IEEE 802.15.4 wireless system-on-chip with up to 256 Kbytes of embedded Flash memory", Mar. 2012, www.st.com.

* cited by examiner

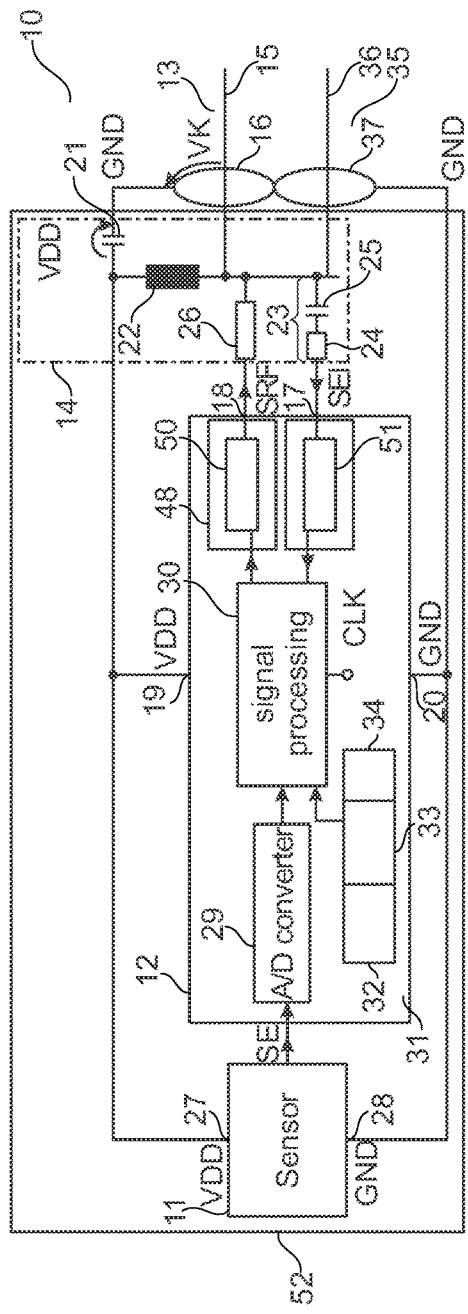
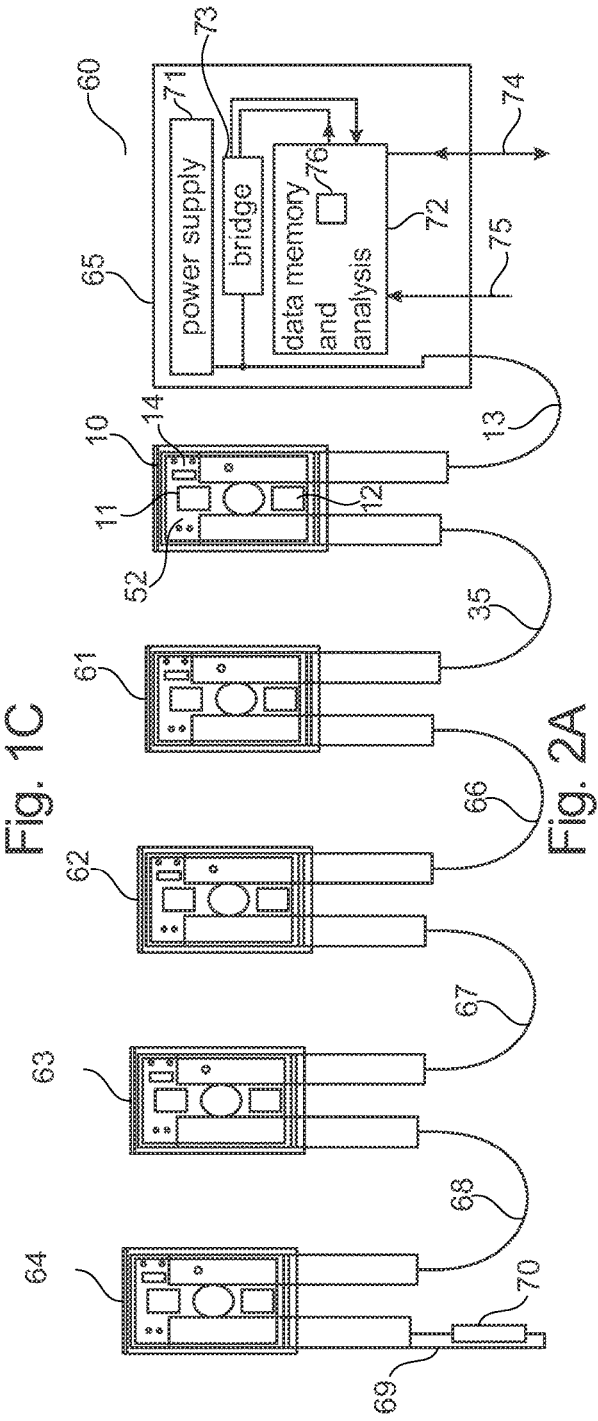
Fig. 1C
Fig. 2A

SENSOR ARRANGEMENT AND METHOD FOR CREATING AN OUTPUT SIGNAL

BACKGROUND OF THE INVENTION

The invention relates to a sensor arrangement, a sensor bus system with a sensor arrangement, and a method for creating an output signal.

A sensor system often comprises a plurality of sensor arrangements, which deliver signals to an evaluation device via a signal line. The evaluation device supplies the sensor arrangement with power via a voltage supply line.

Document DE 102005059012 A1 concerns a system for connecting a plurality of sensors or actuators to a control, wherein two-lead ribbon cables and coaxial cables are utilized to connect the units.

SUMMARY OF THE INVENTION

A problem of the present invention is to provide a sensor arrangement, a sensor bus system with a sensor arrangement, and a method for creating an output signal, which can be realized at low cost.

The problem is solved by the sensor arrangement and method according to the present invention.

In an embodiment, a sensor arrangement comprises a sensor for a mechanical quantity or a thermal quantity, a processing circuit, which is connected at the input end to the sensor, and a cable, which is coupled to the processing circuit. The processing circuit provides an output signal, which is processed for wireless transmission. The output signal or a signal derived from the output signal is supplied to the cable. The cable delivers a power supply to the processing circuit.

It is advantageous for the processing circuit to process a sensor signal emitted by the sensor or its characteristic parameters for a wireless network and to emit the signal thus processed as the output signal. The output signal is not radiated into the room, however. The output signal is transmitted via the cable. The cable additionally serves as voltage supply of the sensor arrangement.

In an embodiment, the processing circuit comprises a transmitter, which generates the output signal and, in doing so, processes it for wireless transmission. The output signal is free of any steady component. As a result, the transmitter does not leave any data-dependent steady component.

In an embodiment, the output signal is processed for wireless operation in such a way that it is amplitude-modulated and/or frequency-modulated and/or phase-modulated. The bandwidths of the output signal are smaller than the carrier frequencies of the output signal. The carrier frequencies can lie in a free band.

In an embodiment, the processing circuit comprises a receiver. The receiver has a dynamic range greater than 60 dB.

The cable can be a twisted cable.
The cable can be shielded.
In an embodiment, the cable is a coaxial or triaxial cable.
The cable has at least one lead, also referred to as a core.
Preferably, the cable has a first number N of leads, also referred to as cores, with 1 less than/equal to N less than/equal to 10.

In an embodiment, the cable comprises exactly one lead. The cable is realized as a single-core cable. Feedback can be realized via reference potential or ground terminals, for example.

In an alternative embodiment, the cable has exactly two leads. The cable can be realized as a twisted cable or coaxial cable.

In an alternative embodiment, the cable has exactly three leads. The cable can be realized as a twisted cable or triaxial cable. Alternatively, the cable can have two leads realized as inner leads and one outer lead for shielding.

In an alternative embodiment, the cable comprises four leads. The cable is realized with four cores. Two of the four leads serve for power supply of the sensor arrangement. The other two of the four leads serve for transmitting the output signal. For example, the leads are realized as a twisted pair. The cable can have a shielding lead.

In an embodiment, a sensor arrangement comprises a sensor for a mechanical quantity or a thermal quantity, a processing circuit, with is connected at the input end to the sensor, a cable realized as a coaxial cable, and a filter arrangement, which is connected to the processing circuit and the cable. The filter arrangement is designed to generate a supply voltage from a cable voltage applied between a lead of the cable realized as inner lead and an outer lead of the cable and to provide it to the processing circuit.

It is advantageous for the cable to transmit both a signal and the power for supplying the processing circuit and the sensor. Because the outer lead of the cable acts as shielding, interferences are minimized both for the supply voltage and for the signal. It is advantageous for the cable to be coupled to the processing circuit via the filter arrangement, so that interferences are further reduced. It is advantageous for the supply voltage to the processing circuit to be thus applied with exclusively minor fluctuations for power supply of the processing circuit. Advantageously, the number of leads is small.

In an embodiment, a sensor bus system comprises the sensor arrangement. The sensor bus system further has an evaluation device, which is coupled to the sensor arrangement via the cable. The sensor bus system further comprises an additional sensor arrangement, which is connected via another cable to the sensor arrangement. The sensor bus system is free of a wireless network. The transmission of the output signal from the sensor arrangement to the evaluation device occurs free of any wireless transmission. The transmission of the output signal from the sensor arrangement to the additional sensor arrangement likewise occurs free of any wireless transmission. The sensor bus system can be realized as a cable bus system. More than two transmitters and receivers can take part in the cable bus system and be distinguishable. The sensor bus system may be referred to as a sensor network. The sensor bus system can be realized in a low-cost manner.

It is advantageous for the sensor bus system not to be subject to interference by other similarly constructed sensor bus systems or other systems. Advantageously, signals can also be transmitted through bulkheads. The power supply thus occurs through a wireless network cable.

In an embodiment, the sensor arrangement comprises an interface for transmitting the sensor data to the evaluation device. The interface modulates the data with a carrier frequency. The interface has a signal output. The signal output can be implemented as a terminal for wireless data transmission. The terminal for wireless data transmission can be designed as an antenna terminal or coaxial terminal. The interface transmits digital sensor data. Connected between the interface and the cable is the filter arrangement, which separates out frequencies below the carrier frequency.

The frequencies below the carrier frequency serve for power supply of the sensor and processing circuit. The interface further has a signal input.

In an embodiment, the sensor arrangement is connected to a bidirectional bus line. In this case, the signal output is connected to the bidirectional bus line.

In an embodiment, the interface is a wireless local area network interface, abbreviated as WLAN interface.

In an embodiment, the sensor arrangement carries out the data transmission with the connection cables integrated into the sensor arrangement.

In an embodiment, the sensor arrangement is realized as a signal-processing wireless chip, the antenna terminal of which is connected to its power supply cable. In this case, the antenna terminal is not necessarily connected to the same cores of the power supply cable. The wireless chip may also be designed as an FPGA. The wireless chip can be implemented as a WLAN chip or preferably as a WPAN chip. WPAN is the abbreviation for wireless personal area network. An advantage lies in the energy savings compared to a transmitting wireless chip, which monitors and regulates its amplification for wireless transmission and reception in the network in an energy-intensive manner and has to regulate its transmission signal over a higher dynamic range than when it is attached to a cable.

In an embodiment, a method for creating an output signal comprises the emission of a sensor signal by a sensor for mechanical or thermal quantities. An output signal is created from the sensor signal by means of a processing circuit. In doing so, the processing circuit processes the output signal for wireless transmission. The output signal or a signal derived from the output signal is supplied to a cable. A power supply is delivered to the processing circuit via the cable.

It is advantageous that the simultaneous transmission of power and signals through the cable keeps the cost of realization low.

BRIEF DESCRIPTION OF THE DRAWINGS

The invention will be explained in detail below for a number of embodiment examples on the basis of the figures. Functional or identically acting components or functional blocks bear the same reference signs. Insofar as components or functional blocks correspond to one another in terms of their function, the description thereof will not be repeated in each of the following figures, in which:

FIGS. 1A to 1C show exemplary embodiments of a sensor arrangement;

FIGS. 2A and 2B show exemplary embodiments of a sensor bus system; and

FIG. 3 shows an exemplary embodiment of a sensor arrangement in a holding device.

DETAILED DESCRIPTION OF THE INVENTION

Figure 1A:
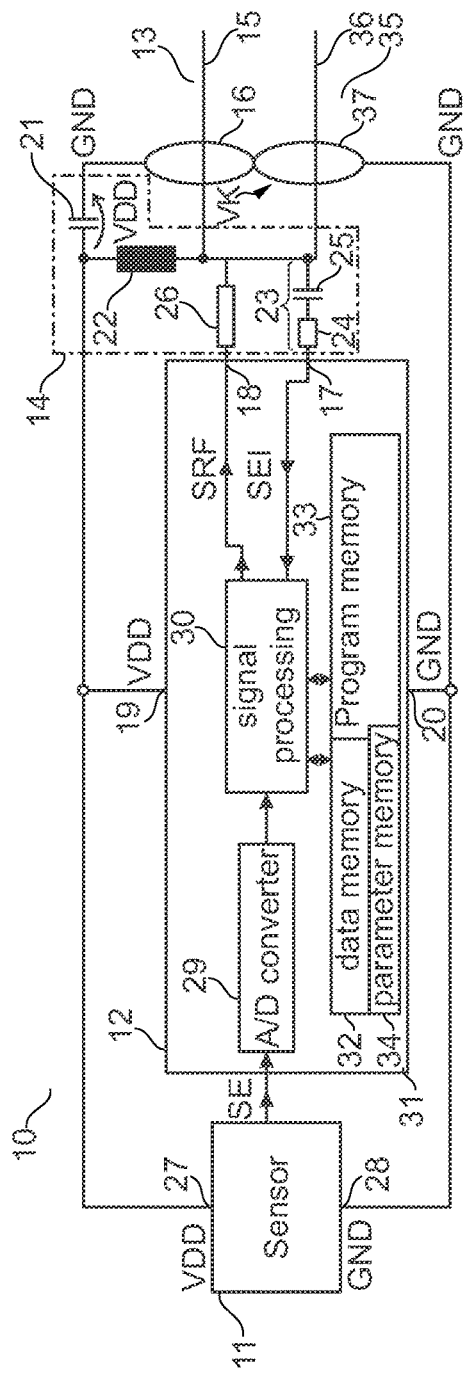

FIG. 1A shows an exemplary embodiment of a sensor arrangement 10. The sensor arrangement 10 comprises a sensor 11, a processing circuit 12, a cable 13, and a filter arrangement 14. The processing circuit 12 is connected to an input on the sensor 11. The filter arrangement 14 couples the processing circuit 12 to the cable 13. The cable 13 is realized as a coaxial cable. The cable 13 can be laid above ground or underground. The cable 13 is a two-pole cable of concentric design. The cable 13 has a lead 15 and another lead 16. The lead 15 is realized as an inner lead or core. The other lead 16 is implemented as an outer lead. The lead 15 is surrounded by the hollow-cylindrical additional lead 16 with constant spacing. The cavity consists of an insulator or dielectric, such as air. The additional lead 16 is protected to the outside by an insulating and watertight protective sheath.

The processing circuit 12 comprises a signal input 17 and a signal output 18. The processing circuit 12 further has a power supply input 19 and a reference potential terminal 20. The filter arrangement 14 is attached to the lead 15, the power supply input 19, and the reference potential terminal 20. The filter arrangement 14 is additionally connected to the additional lead 16. The filter arrangement 14 is further coupled to the signal input 17 and the signal output 18. The filter arrangement 14 has a storage capacitor 21. A first electrode of the storage capacitor 21 is coupled to the lead 15 and a second electrode of the storage capacitor 21 is coupled to the additional lead 16. An inductor 22 is arranged between the storage capacitor 21 and the lead 15. The first electrode of the storage capacitor 21 is connected to the power supply input 19 of the processing circuit 12. On the other hand, the second electrode of the storage capacitor 21 is connected to the reference potential terminal 20 of the processing circuit 12. A power supply input 27 of the sensor 11 is coupled to the power supply input 19 of the processing circuit 12. A reference potential terminal 28 of the sensor 11 is likewise coupled to the reference potential terminal 20 of the processing circuit 12.

The signal input 17 is coupled to the lead 15. A high-pass filter 23 of the filter arrangement 14 couples the lead 15 to the signal input 17. The high-pass filter 23 comprises a high-pass resistor 24 and a high-pass capacitor 25, which are arranged with respect to each other in series. The high-pass resistor 24 diminishes an insertion loss. The signal output 18 is coupled to the lead 15. A resistor 26 of the filter arrangement 14 connects the signal output 18 to the lead 15. The resistor 26 diminishes an insertion loss. The processing circuit 12 comprises an analog/digital converter 29, abbreviated AD converter, which is connected at the input end to the sensor 11. The sensor 11 is coupled to the AD converter 29 via a filter, which is not illustrated, and conditioning stages.

The processing circuit 12 further comprises a processor 30, which is connected at the input end to the AD converter 29 and to the signal input 17. The processor 30 may be realized as a microprocessor or digital signal processor. The processor 30 is connected at the output end to the signal output 18. Furthermore, the processing circuit 12 comprises a memory 31, which is connected to the processor 30. The memory 31 has a data memory 32, a program memory 33, and a parameter memory 34. The processing circuit 12 is thus realized as a wireless frequency analog processor. The signal output 18 is therefore implemented as a wireless frequency output. The signal output 18 can also be constructed as an antenna terminal, which is designed for wireless data transmission, although here it is connected to the cable 13. The signal input 17 is correspondingly designed as a wireless frequency input.

Furthermore, the sensor arrangement 10 comprises another cable 35 with an additional lead 36 and another additional lead 37. The additional lead 36 is realized as an inner lead or core. The other additional lead 37 is implemented as an outer lead. The additional lead 36 of the additional cable 35 is connected to the lead 15 of the cable 13. The other additional lead 37 of the additional cable 35 is likewise connected to the additional lead 16 of the cable 13. Accordingly, the two leads 15, 36 are connected directly and permanently to each other. The two additional leads 16, 37, realized as outer leads, are likewise connected directly and permanently to each other. The cable 13 and the additional cable 35 form a coaxial cable bus.

A cable voltage VK is applied between the lead 15 and the additional lead 16 of the cable 13. The cable voltage VK is likewise applied between the additional lead 36 and the other additional lead 37 of the additional cable 35. The cable voltage VK is converted by the filter arrangement 14 to a supply voltage VDD, which is applied to the storage capacitor 21. The supply voltage VDD is thus applied between the power supply input 19 and the reference potential terminal 20 of the processing circuit 12 and between the power supply input 27 and the reference potential terminal 28 of the sensor 11. The supply voltage VDD thus supplies the sensor 11 and the processing circuit 12 with electrical power. The storage capacitor 21 serves for storing and smoothing the supply voltage VDD. The inductor 22 keeps high-frequency signal components of the cable voltage VK away from the storage capacitor 21. The inductor 22 and the storage capacitor 21 thus act as a low-pass filter, so that the supply voltage VDD fluctuates only slightly. The storage capacitor 21 thus serves to decouple direct current voltage.

The sensor 11 comprises a vibration sensor element, an acceleration sensor element, a speed sensor element, a path sensor element, a temperature sensor element, a pressure sensor element, a rotational speed sensor element, an end position sensor element, or an angle sensor element. The sensor 11 can be designed as a piezo sensor, inductive sensor, or microsystem, referred to as a micro-electromechanical system, abbreviated MEMS. The sensor 11 can be very small. The sensor 11 generates a sensor signal SE. The processing circuit 12 generates an output signal SRF from the sensor signal SE or its characteristics parameters. The sensor signal SE is supplied to the AD converter 29. An output signal of the AD converter 29 is supplied to the processor 30 and processed by the processor 30. The processor 30 uses the code stored in the program memory 33 as well as the parameters stored in the parameter memory 34 for signal processing. The processor 30 deposits measurement data as well as intermediate and final results of the signal processing in the data memory 32. The processor 30 generates the output signal SRF, which is emitted at the signal output 18. The output signal SRF is formed depending on the sensor signal SE. The output signal SRF is generated from the sensor signal SE by means of digital signal processing steps. In doing so, the processor 30 performs, for example, a down sampling, a filtering, a calculation of an envelope curve, and a formation of a characteristic value. The processor 30 further compares the values thus determined with predetermined limit values. The output signal SRF is supplied via the resistor 26 to the lead 15 as well as the additional lead 36.

The cable voltage VK applied to the lead 15 or to the additional lead 36 is filtered by means of the high-pass filter 23 and is supplied as input signal SEI via the signal input 17 to the processor 30. The high-pass capacitor 25 acts to free the input signal SEI of a direct-current component of the cable voltage VK. The processing circuit 12 is thus designed to receive data via the input signal SEI and to emit data by means of the output signal SRF. The processing circuit 12 has exactly one semiconductor substrate on which a circuit is integrated. The processing circuit 12 is thus realized as a one-chip solution. The processing of the sensor data, including the provision thereof, is performed in a form suitable for transmission on a single chip, that is, with small sensor size and of light weight.

The cable voltage VK thus has a direct-current voltage component that corresponds to the supply voltage VDD. Accordingly, the supply voltage required by the sensor 11 is applied to the cable 13 as well as a carrier frequency modulated by the data of the sensor 11. The cable 13 serves for power supply to the sensor arrangement 10 and for data communication with the sensor arrangement 10. The carrier frequency is taken from the range of 0.4 to 7 GHz. It is advantageous for the filter arrangement 14 to effect a separation of direct-current voltage and alternating-current voltage components of the cable voltage VK. There is no interference with the transmission of the sensor data due to the direct-current voltage component in the cable voltage VK. The high-frequency components in the cable voltage VK likewise do not interfere with the supply voltage VDD. The sensor 11 can thus advantageously deliver a precise sensor signal SE. The output signal SRF may also be referred to as a wireless signal.

The processor 30 can be, for example, the Analog Devices ADuCRF101 processor, the STMicroelectronics STM32W108 processor, the Texas Instruments MSP430F6137 processor, or the NXP JN5148-001 processor. Besides the A/D conversion, the signal processing occurs in the processor 30 in the form of down sampling, filtering, the formation of envelope curves and other characteristic values, and the comparison with limit values in order to trigger an alarm, for example. To this end, the microcontroller 30 has available the program memory 33, which can be loaded via the data bus. Additional memories 32, 34 contain parameters and other data. Furthermore, the processing of the determined data is performed in microcontroller 30 for RF transmission in the frequency range from 0.4 to 7 GHz. In this case, the carrier frequency for the RF signal used in the processor 30 lies in a range from 0.4 to 7 GHz. The digital data are modulated with this carrier. Here, it is advantageous that the processor 30, besides the power supply and the sensor 11, can be the sole chip on a circuit board, which is not illustrated, and, besides the RF transmission, also performs a processing of the measurement data.

The sensor arrangement 10 can be realized in a low-cost manner, is simple to install, and is of light weight. The sensor arrangement 10 is supplied with voltage by a cable 13 that is connected to the antenna terminal 18 for wireless data transmission. The cable 13 represents a low-cost medium for data transmission. The terminal for the cable 13 is integrated in the sensor housing. Alternatively, the terminal can be made at the connection for an antenna of a WLAN. A simple electronic filter, such as an LC element, is adequate for separating the high-frequency digital signal form the low frequency component serving for power supply, with null frequency in the case of direct-current power supply. Of advantage are the reduced hardware expense, the reduced installation expense, and the reduced expense in firmware, because largely standardized components are used. In the ranges mentioned, the diversity of elements, such as hardware components, firmware, and software, is reduced.

The cable 13 can be a transmission line for wireless data communication designed as an antenna cable. The cable 13 can be a WLAN cable. Inserted between the cable 13 and the processing circuit 12 is the filter arrangement 14, which is an RC or LC filter and serves for separating an electrically low-frequency component from this antenna line. This low-frequency component is fed to the power supply of the sensor 11 and the processor 30. In the design of the sensor arrangement 10, the terminal for the wireless data transmission from and to the sensor arrangement 10 or the processor 30 is equipped internally with the filter arrangement 14 for low-frequency separation. Further realized are two terminals for an antenna or a cable.

A sensor arrangement can be retrofitted in that the antenna cable 13 is detached in the interior of the housing and the filter arrangement 14, which separates the low-frequency component of the signal applied to the antenna, is installed there in order than this low-frequency component can be utilized for voltage supply of the sensor 11 and the processing circuit 12. In place of a WLAN antenna, which is usually screwed onto the housing, a T-connector or a Y-connector is attached for the cable 13, 35. The WLAN antenna or the T-piece can also be attached differently to the sensor arrangement 10 than by using a thread, for example by clamping or by using a plug-in connector.

Alternatively, the processing circuit 12 can comprise more than one semiconductor substrate with an integrated circuit. For example, the processing circuit 12 can be implemented as a two-chip solution. The processing circuit 12 can comprise, for example, a Texas Instrument CC2511 System-on-Chip and an Advanced Risc Machine, abbreviated ARM, with a digital signal processor, abbreviated DSP.

In an alternative embodiment, a field programmable gate array, abbreviated FPGA, is arranged between the AD converter 29, the signal output 18, and signal input 17.

In an alternative embodiment, which is not shown, the supply voltage VDD is applied between the additional lead 16 and the reference potential terminal 20. The additional lead 16 is then connected to the power supply inputs 19, 27. The lead 15 is connected to the signal output 18 and the signal input 17. The supply voltage VDD is thus applied to the shielding of the coaxial cable 13. Because the supply voltage VDD is not applied to the same lead of the cable 13 as the signal, the filter arrangement 14 can be dispensed with.

Figure 1B:
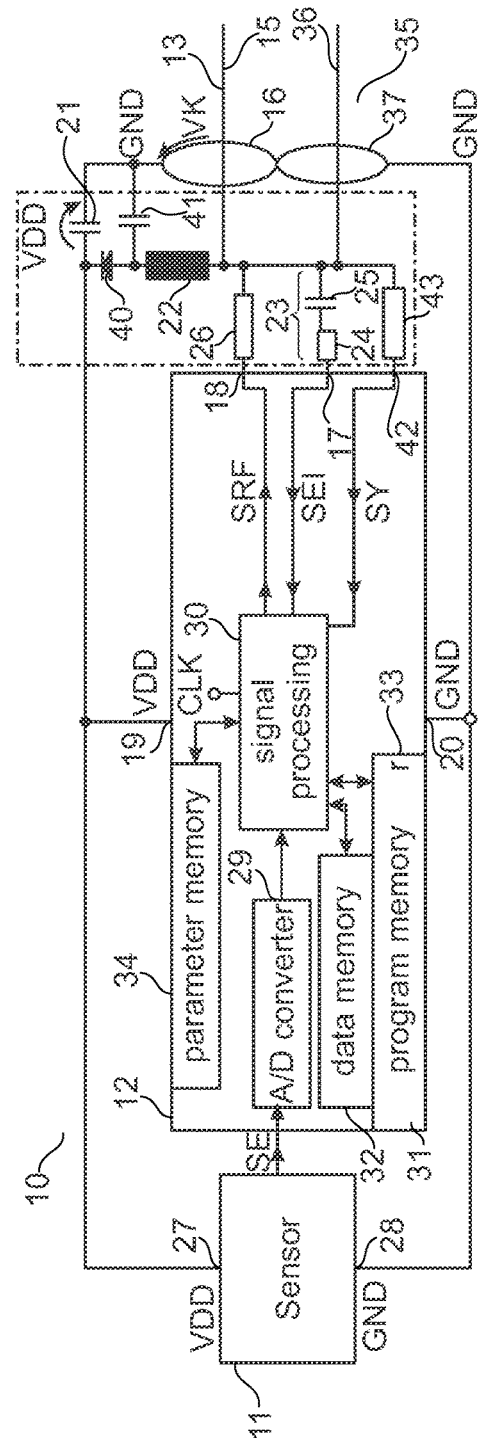

FIG. 1B shows another exemplary embodiment of the sensor arrangement 10, which is a further development of the embodiment shown in FIG. 1A. The filter arrangement 14 additionally comprises a rectifier circuit 40. The rectifier circuit 40 is arranged between the inductor 22 and the storage capacitor 21. The rectifier circuit 40 comprises a diode, which couples the inductor 22 to the storage capacitor 21. Furthermore, another capacitor 41 couples a node between the rectifier circuit 40 and the inductor 41 to the additional lead 16. The additional capacitor 41 and the inductor 22 thus form a series circuit, which connects the lead 15 to the additional lead 16. The supply voltage VDD is produced by rectification of the cable voltage VK by means of the rectifier circuit 40. The supply voltage VDD can thus be produced from a direct-current component of the cable voltage VK as well as from an alternating-current component of the cable voltage VK. Preferably, the alternating-current voltage component of the cable voltage VK provided for creating the supply voltage VDD has a low frequency, so that the inductor 22 represents exclusively a small alternating-current voltage resistor.

The processing circuit 12 additionally has a synchronization input 42, which is coupled to the lead 15. The filter arrangement 14 comprises another resistor 43, which is arranged between the synchronization input 42 and the lead 15. The additional resistor 43 diminishes an insertion loss. A synchronous trigger signal SY is applied to the synchronization input 42. The synchronous trigger signal SY is realized as a pulse signal with a low frequency. The pulses have a duration of 10 µs, for example. The processing circuit 12 generates a clock signal CLK, which is synchronized with the synchronous trigger signal SY. Various sensor arrangements can be actuated by means of the synchronous trigger signal SY in such a way that the clock signals CLK of the sensor arrangements are nearly identical. The processing circuit 12 thus comprises a clock, which is not illustrated, referred to as a time ticker, which is synchronized by regular pulses in the synchronous trigger signal SY by a clock in an evaluation device, which is not illustrated. As a result, drifting of the clock is prevented. The synchronous trigger signal SY can be provided depending on a rotational speed of a machine to which the sensor arrangement 10 is fastened. An interface of the processing circuit 12 comprises the decoupled signal input 17, the RF signal output 18, and the synchronization input 42. The interface is realized as a communication interface.

The sensor 11 comprises an additional sensor element. The additional sensor element can be realized as a vibration sensor element, an acceleration sensor element, a speed sensor element, a path sensor element, a temperature sensor element, a pressure sensor element, a rotational speed sensor element, a stop position sensor element, or an angle sensor element.

The content of the memory 31 can be modified by means of information transmitted by the cable 13 in operation of the sensor arrangement 10. The signal processing performed by the processor 30 can be modified by means of the input signal SEI. To this end, the input signal SEI contains a modified program code, which is stored in the program memory 33. The program memory 33 thus can be reloaded. The program memory 33 is realized as an EEPROM, for example. Further, the parameters stored in the parameter memory 34 can be modified by means of the input signal SEI.

In an alternative embodiment, which is not shown, the rectifier circuit 40 is realized as a two-way or bridge rectifier.

FIG. 1C shows another exemplary embodiment of the sensor arrangement 10, which is a further development of the embodiments shown in FIGS. 1A and 1B. The processing circuit 12 comprises a transmitter 48, which is coupled at the output end to the signal output 18. The transmitter 48 comprises a modulator 50, which connects an output of the processor 30 to the signal output 18. The processing circuit 12 further comprises a receiver 49, which is coupled at the input end to the signal input 17. The receiver 49 has a demodulator 51, which couples the signal input 17 to an input of the processor 30. In a transmitting mode, the modulator 50 produces the output signal SRF by using the carrier frequency. The modulator 50 processes an output signal of the processor 30 for the wireless transmission and emits this processed signal as an output signal SRF. The output signal SRF is designed such that it could be transmitted when it is supplied to an antenna. However, the output signal SRF is supplied to the cable 13 and not to an antenna. In a receiving mode, the demodulator 51 demodulates the input signal SEI by using another carrier frequency. The carrier frequency and the other carrier frequency lie in a range from 0.4 to 7 GHz. The output signal SRF is thus a high-frequency signal, in which a carrier signal is modulated with the sensor data. The demodulator 51 correspondingly generates from the high-frequency input signal SEI, which corresponds to the high-frequency component of the cable voltage VK, a signal that is supplied to the processor 30. It is possible by means of the input signal SEI to synchronize the clock signal CLK, which the internal clock of the sensor arrangement 10 emits. The synchronization input 42 can thus be dispensed with.

The sensor arrangement 10 comprises a circuit board 52, on which the sensor 11, the processing circuit 12, and the filter arrangement 14 are arranged. The circuit board 52 is arranged in a housing. The housing is watertight and dust-tight.

FIG. 2A shows an exemplary embodiment of a sensor bus system 60. The sensor bus system 60 has the sensor arrangement 10 according to the embodiments shown in FIGS. 1A to 1C. Furthermore, the sensor bus system 60 comprises additional sensor arrangements 61 to 64. Overall, the sensor bus system 60 thus comprises a first number N of sensor arrangements. The first number N is greater or equal to 1. Furthermore, the sensor bus system 60 comprises an evaluation device 65, which is connected to the sensor arrangement 10 via the cable 13. The sensor arrangement 10 is connected to the additional sensor arrangement 61 via the additional cable 35. The sensor arrangement 10 as well as the additional sensor arrangements 61 to 64 are arranged successively in series and connected to one another via the cables 36, 66 to 68. The last sensor arrangement 64 of the first number N of sensor arrangements is connected at its additional cable 69 to a termination circuit 70. The terminal of the last sensor arrangement 64, at which there is no connection to the next sensor arrangement, is connected to the termination circuit 70. The termination circuit 70 has a resistor, which is arranged between the additional lead and the lead of the additional cable 69. This terminal resistor is designed in accordance with the cable impedance of the cable 13, realized as a coaxial cable. The sensor arrangement 10 and the evaluation device 65 have two separate housings. The sensor arrangement 10 is positioned at least one meter away from the evaluation device 65.

The evaluation device 65 comprises a power supply 71, another processor 72, and a bridge 73. The bridge 73 is realized as a high-frequency bridge. The power supply 71 as well as the bridge 73 are connected to the cable 13. The direct-current voltage component of the cable voltage VK is thus produced by means of the power supply 71. The bridge 73 serves to separate the direct-current voltage component of the cable voltage VK from the additional processor 72 and to transmit the signals, which are carried via the cable 13, to the additional processor 72. The additional processor 72 comprises another data memory 76. The additional processor 72 serves for data memory and analysis. The sensor bus system 60 is realized as a data communication network. The evaluation device 65 as well as the sensor arrangements 10, 61 to 64 can communicate with one another in a way corresponding to a WLAN or a wireless personal area network, abbreviated WPAN. The sensor bus system 60 can us IEEE Standard 802.11x or IEEE Standard 802.15.x. Examples of standards that can correspondingly be applied by the sensor bus system 60 are Bluetooth, ZigBee, Communications Software and Services, abbreviated CSS, Ultra-Wide Band, abbreviated UWB, and Wi-Fi. The additional processor 72 is connected to another unit, which is not shown, via an Ethernet remote data transmission 74. The evaluation device 65 can be joined to a WPAN, LAN, WAN, or Internet. The additional processor 72 has a signal input 75, to which information, such as an angle of rotation and/or a power of a machine, is supplied.

The processing circuit 12 is implemented such that an output signal SRF is provided at the signal output 18 and can be radiated via an antenna, although it is transmitted to the evaluation device 65 via the cable 13. The output signal SRF is thus not radiated by means of the antenna. The sensor arrangement 10, the additional sensor arrangements 61 to 64, and the analysis unit 65 are free of an antenna. The output signal SRF, which can be radiated via wireless transmission when an antenna is present, is thus transmitted exclusively via the cable 13 from the sensor arrangement 10 to the evaluation device 65. The communication of the sensor arrangements 10, 61, and 64 with the evaluation device 65 thus occurs free of radio waves.

A cable bus comprises the cable 13 as well as the additional cable 35. The direct current voltage required by the sensors, a carrier frequency in the range from 0.4 to 7 GHz modulated with the data, and the synchronous trigger signal SY are applied at the cable bus. The sensor arrangements 10, 61 to 64 as well as the cables 13, 36, 66 to 69 can be prepackaged. On account of use of the cables 13, 35, the transmission of data is less sensitive to interference. The sensor bus system 60 emits only minor interfering signals. The sensor bus system 60 comprises a plurality of sensor arrangements 10, 61 to 64, which are arranged at a bus in series. This series arrangement makes it possible to reduce the length of connecting cables overall in comparison to a star-shaped cable arrangement, because only one cable from the additional processor 72, with connection to LAN or another network, to the adjacent sensor arrangement 10 as well as one additional cable per sensor arrangement are required.

The additional processor 72 is arranged at one end of the linear coaxial bus system. Additional direct terminals 75 for other measurement data or sensors are placed on the additional processor 72. The additional processor 72 can also have an interface for the WLAN via an antenna. Located in the evaluation device 65 are the additional processor 72, the power supply 71 of the sensor arrangements via a power adapter, and the interface 74 to the LAN and/or to another network, such as via a field bus. The power adapter is decoupled from the data line 13 via a bridge 73, realized as an LC filter, just like in the sensor arrangements 10, 61 to 64. Additional components of the additional processor 72 are memories for data and programs as well as indicators (lamps, display screens) for the display of system states or alarms or other information. The evaluation device 65 is supplied with power via the power mains. The evaluation device 65 can modify the content of the memory 31 by means of information transmitted by the cable 13 in an operation of the sensor arrangement 10. The evaluation device 65 can modify the content of the program memory 33 of the sensor arrangement 10 via the cable 13. The evaluation device 65 can likewise modify the content of the parameter memory 34 of the sensor arrangement 10 via the cable 13.

In an embodiment, the cables 13, 35 are connected to the processing circuit 12 already during fabrication. In this way, the sensor arrangement 10 can be designed to be smaller and lighter in weight that when, for example, plug-in or screw connectors are provided. A terminal or the cable 13 serves to link the sensor arrangement 10 to the preceding sensor arrangement in the bus or the bus server 65. The additional terminal or the additional cable 35 serves to connect the sensor arrangement 10 to the sensor arrangement 61 that next follows or to the termination 69.

The connection between the cable 13 to the sensor arrangement 10 and the additional cable 35 to the sensor arrangement 10 is free of a cable plug and free of a cable socket. Accordingly, the sensor bus system 60 can be realized without a cable plug or a cable socket. Alternatively, the sensor arrangement 10 has a cable socket for connecting a cable plug of the cable 13. The sensor arrangement 10 can likewise comprise a cable socket for connecting a cable plug of the additional cable 36. Accordingly, a replacement of the sensor arrangement 10 is facilitated in the event of a defect.

The design of the sensor bus system 60 is thus a wired data bus in linear topology, the cables 13, 35, 66 to 69 of which serve for power supply of the sensor arrangements 10, 61 to 64. Of advantage is the possibility of equipping a sensor bus system 60 with only a single communication system, which, depending on the respective circumstances, can be operated in a wired or wireless manner. In this way, a system transition between wireless and wired communication is thus facilitated. Another advantage consists in an increased flexibility, which, when adapted to the respective surroundings, makes possible a simple alternation between sensor arrangements 10, 61 to 64 communicating in a wireless and wired manner, without the use of other communication hardware being required.

Alternatively, an active termination, at which there is no connection to the next sensor arrangement, is placed after the last sensor arrangement 64, with the voltage component serving for power supply also being compensated. Because the bus line is used for power supply, the power loss is reduced by the active termination in contrast to a simple terminating resistor.

Figures 2B, 3:
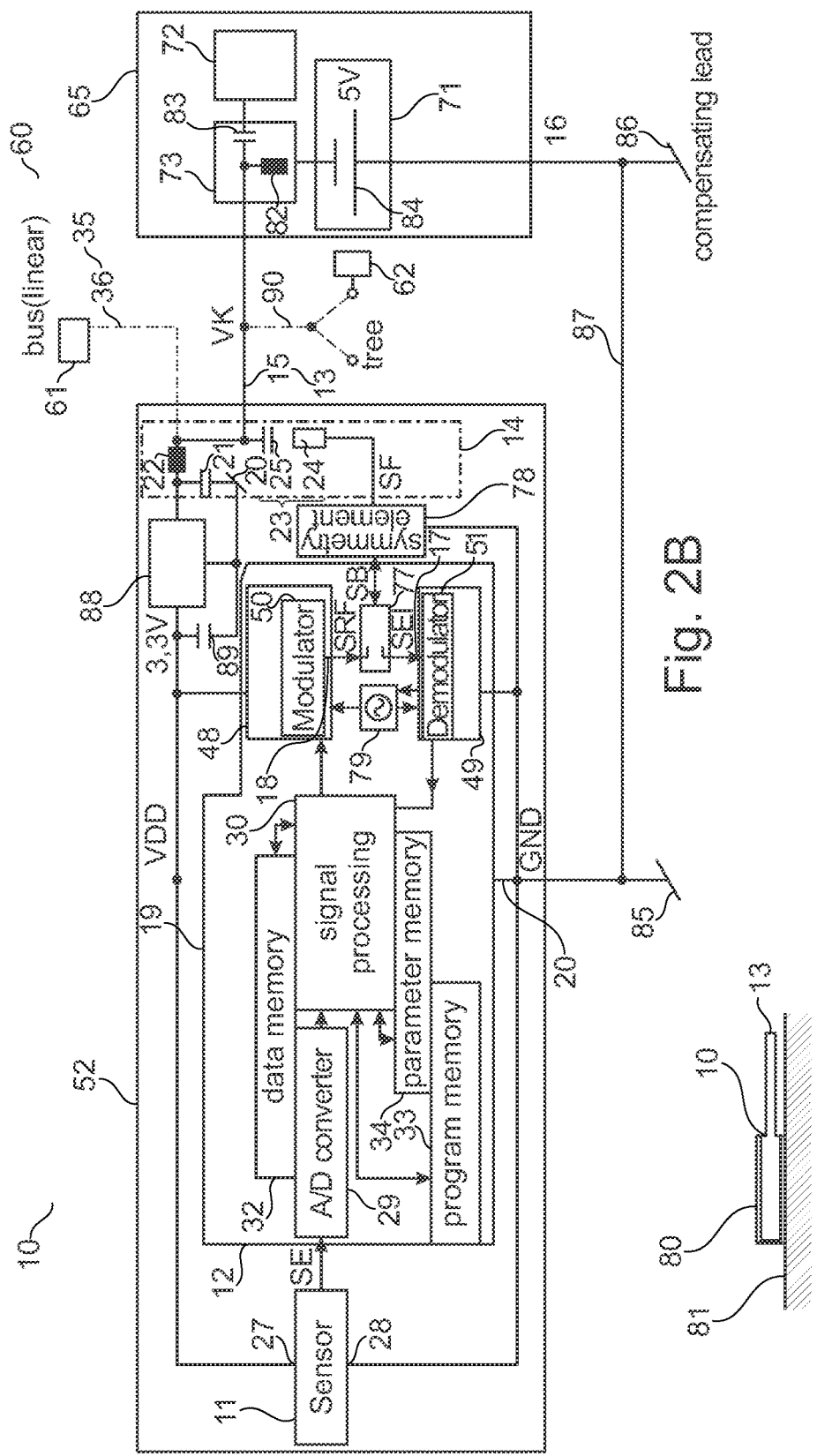

FIG. 2B shows another exemplary embodiment of the sensor bus system 60, which is a further development of the embodiment shown in the figures above. The cable 13 has exactly one lead 15. The cable 13 accordingly has one core. The lead 15 is thus realized as a single lead. The processing circuit 12 comprises a switch 77, which is arranged between the lead 15 and the transmitter 48 as well as the receiver 49. The switch 77 thus couples the modulator 50 and the demodulator 51 to the lead 15. Arranged between the switch 77 and the lead 15 is the filter arrangement 14. The switch 77 is coupled to the lead 15 via the high-pass filter 23. The processing circuit 12 can be realized as an RF analog processor.

The sensor arrangement 10 further comprises a symmetry element 78. The symmetry element 78 is arranged between the switch 77 and the filter arrangement 14. The symmetry element 78 may also be referred to as a balun. An asymmetrical side of the symmetry element 78 is coupled to the lead 15 via the filter arrangement 14. A symmetric side of the symmetry element 78 is connected to the switch 77. The symmetry element 78 serves for coupling between the symmetrically realized switch 77 and the asymmetrically realized cable 13. The symmetry element 78 and the switch 77 are thus connected via two leads. The switch 77 and the modulator 50 as well as the switch 77 and the demodulator 51 are likewise connected via two leads.

A wireless signal SB is applied between the switch 77 and the symmetry element 78. A filter signal SF is applied between the symmetry element 78 and the filter arrangement 14. The output signal SRF of the modulator 50 is supplied to an input of the switch 77 and emitted in transmitting mode to a terminal of the switch 77 as a wireless signal SB. The terminal of the switch is coupled to the lead 15. The input of the switch 77 is connected to the modulator 50. The wireless signal SB is supplied in receiving mode to the terminal of the switch 77 and emitted as a receiving signal SEI at the demodulator 51 from the switch 77 at an output of the switch 77. The output of the switch 77 is connected to the demodulator 51. The switch 77 is realized as a change-over switch, which changes over on transition from transmitting to receiving mode or on transition from receiving to transmitting mode. The cable voltage VK and the filter signal SF are asymmetric signals. By contrast, the wireless signal SB, the output signal SRF, and the input signal SEI are symmetric signals.

The processing circuit 12 further comprises a generator 79, which couples the modulator 50 and the demodulator 51. The generator 79 is realized as an oscillator. The generator 79 produces the carrier frequency and emits it to the modulator 50. The generator 79 produces a receiving carrier frequency and emits it to the demodulator 51. The receiving carrier frequency is reconstructed by means of a coupling between the demodulator 51 and the generator 79 such that the reception is optimized by the demodulator 51.

The processing circuit 12 additionally comprises a voltage regulator 88. The voltage regulator 88 is connected at the input end to the storage capacitor 21. At the output end, the voltage regulator 88 is connected to the power supply input 19 of the processing circuit 12 and to the power supply input 27 of the sensor 11. The voltage regulator 88 is further connected to the reference potential terminal 20. A smoothing capacitor 89 couples the output of the voltage regulator 88 to the reference potential terminal 25. The voltage applied to the storage capacitor 21 is fed to the voltage regulator 88. The voltage regulator 88 delivers the supply voltage VDD at the output end. The voltage regulator 88 can be designed as a low dropout regulator or DC/DC converter.

The bridge 73 of the evaluation device 65 has a bridge inductor 82 and a bridge capacitor 83. The bridge inductor 82 couples the power supply 71 to the lead 15. Furthermore, the bridge capacitor 83 is arranged between the additional processor 72 and the lead 15. The power supply 71 comprises a voltage source 84.

The reference potential terminal 20 of the processing circuit 12 is connected to a ground terminal 85. The evaluation device 65 is connected to another ground terminal 86. In particular, the power supply 71 is connected to another ground terminal 86. A compensating lead 87 connects the ground terminal 85 to the additional ground terminal 86. The compensating lead 87 is realized as a machine potential compensating lead. The compensating lead 87 thus effects a feedback between the sensor arrangement 10 and the evaluation device 65. In general, it is of advantage when the compensating lead 87 is already present in machinery. Accordingly, a cable with exclusively a single lead 15 is adequate for installation of the sensor bus system 60, because the reference potential terminals 20, 28 of the sensor arrangement 10 and the reference potential terminals of the evaluation device 65 are coupled via the compensating lead 87.

In an embodiment indicated by points, the additional cable 35 is connected directly to the sensor arrangement 10. The additional cable 35 has the additional lead 36. The additional cable also comprises exactly one lead. The additional cable 35 connects the sensor arrangement 10 to the additional sensor arrangement 61. Accordingly, the sensor bus system 60 is realized as a linear system. Alternatively, however, the additional cable 35 can be dispensed with.

In an embodiment indicated by points, the sensor bus system 60 comprises an additional lead 90. The additional lead 90 is connected at a node of the lead 15 between the sensor arrangement 10 and the evaluation device 65. The additional lead 90 can be connected to another lead or to another sensor arrangement 62. The sensor bus system 60 can thus be realized as a tree system or star system.

In an alternative embodiment, which is not shown, the cable 13 has four leads. In the case of a four-core cable, two cores can be used for the signal and two cores for the power supply. The cable 13 optionally has a shielding lead. Preferably, the cable 13 is not realized as a coaxial cable. The cable 13 can be designed as a twisted pair. If different cores are used for signal and power supply, the filter arrangement 14 can be dispensed with and replaced by leads.

FIG. 3 shows an exemplary embodiment of the sensor arrangement 10 with a holding device 80, which is a further development of the embodiments shown in FIGS. 1A to 1C as well as 2A and 2B. The holding device 80 can be realized as a stainless steel sheet case. The sensor arrangement 10 comprises the cable 13 and is free of a metal housing. The holding device 80 is joined detachably to the sensor arrangement 10. The holding device 80 is constructed so to mechanically protect and fix in place the sensor arrangement 10. The sensor arrangement 10 is inserted detachably into the holding device 80. The sensor arrangement 10 is clicked in place in the holding device 80. The holding device 80 is adhesively attached to a machine 81. The holding device 80 is firmly held in place on the machine 81 during curing of the adhesive by auxiliary magnets. The sensor 11 comprises a vibration sensor element. The sensor arrangement 10 is placed at a measuring site of a machine 81 that is to be measured for vibrations.

It would be appreciated by those skilled in the art that various changes and modifications can be made to the illustrated embodiments without departing from the spirit of the present invention. All such modifications and changes are intended to be covered by the appended claims.

What is claimed is:

1. A sensor arrangement, comprising:
    a sensor for a mechanical quantity or a thermal quantity of a machine; the sensor having an input and an output, the sensor configured and arranged to be attached to the machine;
    a processing circuit having an input end and an output end, the input end of the processing circuit connected to the output of the sensor and providing an output signal through the output end, which is processed for a wireless transmission; and
    a transmitter coupled to the processing circuit and including a modulator for modulating the output signal; and
    a cable, which is coupled to the processing circuit and transmitter;
    the cable having a lead configured and arranged to feed a power supply from an external power supply source to the processing circuit;
    the processing circuit configured to supply the output signal or a signal derived from the output signal, which is processed for wireless transmission, to the lead of the cable for wired transmission through the cable; and
    wherein the output signal is modulated by the modulator of the transmitter according to at least one modulation process from a group comprising amplitude modulation, frequency modulation, and phase modulation.

2. The sensor arrangement according to claim 1, further comprising:
    a receiver coupled to the cable and including a demodulator.

3. The sensor arrangement according to claim 2, further comprising:
    a switch, which is arranged between the transmitter, the receiver, and the cable.

4. The sensor arrangement according to claim 1, wherein the processing circuit includes:
    an analog/digital converter, which is coupled at the input end to a signal output of the sensor;
    a processor, which is connected at the input end to the analog/digital converter; and
    a memory, which is connected to the processor.

5. The sensor arrangement according to claim 4, wherein the content of the memory can be modified by means of information transmitted by the cable in an operation of the sensor arrangement.

6. The sensor arrangement according to claim 1, wherein the cable is a coaxial cable and the sensor arrangement further includes a filter arrangement, which is connected to the processing circuit and the cable and is configured and arranged to generate a supply voltage from a cable voltage applied between a lead of the cable and another lead of the cable and to deliver it to the processing circuit.

7. The sensor arrangement according to claim 1, wherein the cable is a one-core cable and has exactly one lead and in which the sensor arrangement further includes a filter arrangement, which is connected to the processing circuit and the lead and is designed to generate a supply voltage from a cable voltage applied between the lead and a reference potential terminal or a ground terminal of the sensor arrangement and to deliver it to the processing circuit.

8. The sensor arrangement according to claim 1, wherein the processing circuit includes a synchronization input, which is coupled to the cable, and is configured and arranged to produce a clock signal and to synchronize the clock signal with a synchronous trigger signal that can be tapped at the synchronization input.

9. The sensor arrangement according to claim 1, wherein the sensor includes at least one element from the group consisting of: a vibration sensor element, an acceleration sensor element, a speed sensor element, a path sensor element, a temperature sensor element, a pressure sensor element, a rotational speed sensor element, an end position sensor element, and an angle sensor element.

10. The sensor arrangement according to claim 1, further comprising:
    an evaluation device coupled to the sensor arrangement via the cable to provide a sensor bus system, wherein the communication between the evaluation device and the sensor arrangement occurs in a wired manner and free of a wireless transmission.

11. The sensor arrangement according to claim 10, further comprising:
    an additional sensor arrangement, which is connected to the sensor arrangement via another cable, wherein the communication between the evaluation device and the additional sensor arrangement occurs in a wired manner and free of a wireless transmission.

12. A method for producing an output signal for transmission via a cable, the method comprising the steps of:
    attaching a sensor to a machine;
    emitting a sensor signal by the sensor for mechanical or thermal quantities of the machine,
    producing an output signal from the sensor signal by means of a processing circuit, wherein the processing circuit processes the output signal for a wireless transmission, and emitting the output signal or a signal derived from the output signal to a lead of a cable, wherein the output signal has a carrier frequency modulated corresponding to the data of the processed sensor signal;
    transmitting the output signal, which is processed for wireless transmission, through the lead of the cable for wired transmission through the cable; and
    introducing a power supply from an external power supply source to the processing circuit via the lead of the cable.

* * * * *